Patented Oct. 12, 1943

2,331,357

UNITED STATES PATENT OFFICE 2,331,357

PROCESS OF TREATING MINERAL SUBSTANCES AND PRODUCT

George W. Swenson, St. Paul, Minn., assignor to Minnesota Mining & Manufacturing Company, St. Paul, Minn., a corporation of Delaware No Drawing. Application March 28, 1934, Serial No. 717,851

26 Claims. (Cl. 117—23)

This invention relates to improved process for treating mineral substances and to the resultant product and more particularly relates to the manufacture of glazed granules, more especially of the type covered with a glaze containing a coloring matter, and, while the invention is directed particularly to the treatment of naturally refractory materials with a colored glaze or the like, and the article per se, as well as a roofing material made with this article, it will be understood that the invention possesses a wide field of utility and may be adapted for analogous purposes.

This application is a continuation in part of my application S. N. 647,966 filed December 19, 1931, scheduled to issue as Patent No. 2,331,356 on October 12, 1943. Reference is also herein made to my application S. N. 647,967, also filed December 19, 1932, and to the continuation-in-part thereof, viz. S. N. 393,674 scheduled to issue as Patent No. 2,331,868 on October 12, 1943.

The product of this invention may be incorporated as a coating for a roofing shingle or as an aggregate for incorporation in artificial stone such as cast stone and the like, and for the base granule there may be employed natural or artificial refractory substances such, for example, as smoky quartz, or cairngorm stone, sand, stone, slate, quartz, quartzite, limpid quartz crystal as the natural refractory substances, or crushed brick and other baked clay and similar material, porcelain, terra cotta or other ceramic wastes or cement compositions.

The finished product, that is to say, the natural or artificial refractory material with a glazed coating may be incorporated as a weather coating in a bituminously coated sheet for forming roofing material either in rolls or in shingles, or may be incorporated in cast stone.

It is well recognized that many industries employing granular materials are handicapped in the use of colored granules, inasmuch as the existing available material, such as naturally occurring colored rock, does not give either a wide range of colors, nor are the colors of an attractive or permanent nature.

I have discovered that in employing quartzitic granulated materials that on the surfaces of the individual granules after crushing and even after screening there are smaller silica particles of the same material clinging to the granules, ranging in size from that which will pass a 35 mesh screen to that approximating an impalpable powder.

In applying a glaze composition and upon then heating to melt the same, some of the smaller silica particles become fused into the ultimate glaze coating but certain others do not become completely fused. Thus the final coating of fused glaze contains not only silica fines which have been reduced to molten state and become homogeneous with the coating, but the coating also contains the larger particles more or less unfused or partially fused.

It also will be understood from the formula appearing hereinafter that by the addition of silica fines to the coating composition these silica fines also become reduced to a melted condition though some of the larger particles thereof do not melt down entirely but only superficially, thus further producing a coating containing partly fused granule particles and substantially completely fused granule particles.

Microscopic examination of granulated mineral made according to my invention shows the particles of granular mineral material to be coated with a glaze coating comprising the dissolved silica particle content and numerous protuberances of unsolved silica particles, thus disclosing the production of a coating on each particle including relatively much smaller particles of the same material, a portion of these smaller particles being completely fused and a portion of said smaller particles being partly fused; it being further understood that the base granule and the relatively much smaller particles are of the same material.

The principal objects and advantages of this invention reside in the provision of an improved article of manufacture, glazed coated granules, particularly of the colored type, which may be manufactured with a wide range of colors of extreme permanence; the provision of treated granules of the character referred to in which a good bonding action can be attained between the finished granulated material and other bonding materials; the provision of an improved granulated material to be employed as a weather coating on various objects which possesses a permanence of color not heretofore attained by the methods and in the articles known to me, and the provision of glazed granules in which I may be enabled to obtain certain desired color effects and to accomplish this purpose at a cost less than any of the prior methods known to me.

The present invention has as further objects the provision of an improved granulated finished article having a glaze which is permanent in its adherence to the granule, has the property of desired viscosity to facilitate manufacture, has a reactivity toward the base granule which helps in attaining the desired permanence of glaze and/or color; and the provision in such a granulated material of a glaze having an affinity for and an ability to carry color in the necessary strength, and at the same time to possess suitable coefficients of expansion and contraction so that the glaze may be successfully employed on a wide range of different materials employed as the base granule.

This invention also has as one of its objects the provision of an improved method of preparing the improved glaze and applying the same to the granulated material to produce the colored granule and which will produce colored aggregates having high permanence of color and to accomplish this at a relatively low cost; the provision of an improved method of manufacturing colored granulated material in which the intensity of color may be regulated to a desired degree and to such an extent that the color and/or the glaze are not undesirably affected by any quantity of substance such as a fluxing agent employed for enhancing the reaction between the glaze and the granule to which it is applied; and the provision of an improved method of manufacturing colored granular material in which the glazing effect of the coating applied to the individual granules is enhanced, even with the presence of a deep color in the glaze.

I have found that my improved methods of coating granulated material permits of the production of colored aggregates wherein the glaze applied to the individual granules is one containing a pigment, and is substantially opaque, without, however, producing a dulling of the glaze, thus overcoming one of the principal disadvantages of the prior colored granulated material heretofore produced either by artificial methods or that found in natural deposits.

For the purpose of my invention, I have preferred to employ quartzite granules, inasmuch as quartzite is metamorphosed sand stone in which quartz particles are cemented with a silicious cement, sometimes, but not always, containing calcium carbonate and iron oxide. The porosity of quartzite is relatively low, due to the fact that the only possible porosity of quartzite is produced by the intervening portions of cement between the quartz grains, which is a relatively small part of the granule itself. Quartzite appears to possess a further characteristic of having an affinity for the glaze as applied thereto.

One method of producing quartzite granules may include the steps of employing a glazing material in a powdered form ground in an oil grinding liquid such as fish oil, varnish makers' gloss oil or the like, this powdered glaze containing the desired color.

It is now appropriate to point out that the proportion of color to glazing material may be at the outset controlled, and, for my purposes, I prefer to add a quantity of pigment to the mass of glaze to such an extent that the glaze has proper flowing properties, and the desired color is obtained in a single step.

I prefer to use a gloss oil consisting of rosin dissolved in mineral spirits, as a vehicle for suspending and distributing the glaze, inasmuch as this is a low-cost deposit in a form adhering tenaciously to the surface of the quartzite granule. This vehicle in one of the processes, of course, is burned off and forms no permanent part of the finished fused glaze.

The glaze mixture, including the finely divided glaze and the oil vehicle in which it is suspended and the mineral granules, are charged into a mixer such as that commonly used for mixing concrete either separately or together. This batch is then mixed until the glaze suspension is distributed uniformly over the surfaces of the granules.

The thus coated granules are then removed from the mixer and charged in a furnace which may be either of the batch type, that is, one in which each batch is introduced, heat treated, and then removed, or may be of the continuous type rotary furnace, or may be a kiln or furnace in which no agitation takes place. A further alternative may be to leave the batch in the first mixer and apply gas or oil heat thereto, as desired.

The period of time which the object is fired will depend on the kind of base granule employed, and the time is so arranged that the material comes out of the kiln or rotary furnace in a granular condition and needs no further crushing.

The glaze or vitreous enamel which I may employ in this process may be of the raw type, or may be a mixture of the desired components previously fused together and ground, which latter is known as a fritted glaze. In the case of the fritted glaze the color pigment may be added either in the fused mixture or in the subsequent operation in oil.

One formula which I disclose as an example may be as follows for manufacturing green roofing granules:

| | Parts by weight |
|---|---|
| Feldspar | 30 |
| Borax | 32 |
| Red lead | 25 |
| Sodium nitrate | 6 |
| Whiting | 13 |
| Chromium oxide | 14 |
| Cobalt oxide | 1 |

In some instances it may be desired to increase the amount of chromium oxide in the above formula, but the foregoing formula has served to produce a satisfactory color glaze.

This glazing material in an oil vehicle when mixed with the granules to be coated and fired in a rotary furnace, may be subjected to temperatures ranging from 1200° F. to as high as 1600° F. depending upon the glaze mixture and the kind of coating desired.

With the methods herein described, I find that I am enabled to produce a color bearing glaze having a desired strength and variability of color in different degrees as desired, and producing a granule which, while having a substantially complete glaze coating, has the desired uneven surface facilitating the retention of the granule in bituminously or otherwise coated surface of a roofing sheet.

The raw glaze heretofore referred to and one which permits of considerable reduction in the cost of manufacture is one in which the raw materials are not melted together and subsequently ground, but in which these materials are added as separate products mixed physically and ground together.

*Raw glaze formula*

| | Parts by weight |
|---|---|
| Borax | 30 |
| Whiting | 12 |
| Silica fines | 20 |
| Chrome oxide | 7 |
| Sodium dichromate | 14 |

An alternative formula is as follows:

| | Parts by weight |
|---|---|
| Borax | 32 |
| Zinc oxide | 9 |
| Silica | 20 |
| Chrome oxide | 7 |
| Sodium dichromate | 14 |

Reverting to the formula set out herein for manufacturing green roofing granules, I wish to point out that I have varied the percentage of green pigment, namely, chromium oxide, and produced the intensity of color hereinbefore referred to, which I consider to be new in this art. The approximate percentage of chromium oxide to the glaze is preferably 16⅔% where the color content of previous conventional glazes known to me is not in excess of 10%, usually much less. For this reason, my finished article is thus possessed of the characteristic of a more intense, and, therefore, more lasting color and, further, that if, in the manufacture of the colored granules, some chemical reaction takes place which would tend to affect the tone or depth of the coloring, the added quantity of pigment will offset such tendency to affect the ultimate color and prevent injurious effects in the finished color coating.

An example of a formula for this purpose may be as follows:

| | |
|---|---|
| Red lead | 70 |
| Borax | 45 |
| Silica | 25 |
| Chromium oxide | 26 |

From the foregoing it will be observed, therefore, that the new article of manufacture which I produce, that is to say, a colored granulated mineral material, has the characteristics of having each of the individual grains substantially completely coated with a fused glaze in which a pigment is contained in such proportion to the mass of glaze that the desired color is obtained in a single step with a low glaze cost due to the high percentage of color pigment. The glaze coating possesses the necessary physical properties to be highly weatherproof. By the employment of quartzite as the preferred base granule, I find there is less tendency of the base granule physically or chemically reacting to an extent sufficient to injuriously affect the color of the finished coating. This is of considerable importance, inasmuch as it has been found that with some materials employed as the base granule, when subjected to high temperatures necessary to fuse the glaze thereon, the base granule supplies material to react with the glaze coating which has a disastrous effect on the final color, i. e., if the base granule contain too high a percentage of manganese it will be almost impossible to add enough chrome oxide to the glaze to arrive at a desirable green granule. These undesirable features are eliminated by my invention.

In the foregoing I have described one of the processes for producing a green glaze mineral material, and the steps of this process are, first, the step of mixing the glaze with oil or water to form a paste, the second step to coat quartz or quartzite or other mineral substance mentioned with this paste by mixing in a concrete mixer, and the third step to charge the mixture into a furnace and fire by the batch process, with or without agitation. An alternative, as hereinbefore pointed out, may be to agitate the mixture during the heating and fusing step, if desired. In this process a good distribution of glaze and color is obtained in the preliminary mix, that is, in the first step; agitation is not essential to the production of a good coating by the step of heating; and, furthermore, a relatively short process time may be required where a fritted glaze is employed so that the glaze needs only to be melted down in situ and no additional time is needed for coating and maturing it.

I now will proceed to describe several alternative methods for manufacturing colored coated mineral material, one of which processes is as follows:

The glaze employed in this process is conveniently a fritted lead glaze, and the process may be of a continuous nature.

The steps are to wet the mineral, such as quartz or quartzite, in a mixer with a small amount of sodium silicate solution, and, when thoroughly mixed, the dry powdered glaze is introduced. This causes the powdered glaze to adhere to the sodium silicate, and the mixture thus produced of glaze and silicate immediately sets to a hard, dry, adherent film on the surface of the mineral. This mixture is then fed continuously into a rotary furnace and the heat applied to the mixture of glaze quartzite and sodium silicate reduces the glaze to a molten state, thus eventually coating the individual granules with an even coating.

This method has the attendant advantages of economy of the continuous operation, and the fact that sodium silicate when mixed in the proper proportions with the fritted glaze sets to a relatively hard cement, and the quartz, when coated with this cement film, is a free flowing mass which handles nicely in the screw feeder and will flow freely through a feed pipe. Although the sodium silicate glaze film is not uniform enough to produce a uniform and as desirable a coating, when fired, without the step of agitation during firing, the bonding of the glaze granule is an aid to producing a fixed and even coating. Furthermore, this process cuts down the hazard due to dust in the mixture.

A further alternative method is to employ raw glaze in a continuous process together with sodium silicate, and the steps are as follows:

First the raw glaze is made up by mixing together the various powdered raw materials in a concrete mixer with a charge of iron balls or in a ball mill. From this point on, the procedure is to mix the granular material with a small amount of sodium silicate solution for wetting the same. When thoroughly mixed, the glaze is added and adheres to the sodium silicate and immediately sets to a hard, dry, adherent film on the surface of the quartz. It must be kept in mind that the quartz is wet by the sodium silicate solution, and the glaze is added and the mixing is continued until the glaze is uniformly distributed over the quartz. This mixture is then fed continuously into a rotary furnace and heated in a manner sufficient to cause the glaze to melt and flow in each instance on each quartzite granule and form a uniform coating thereon.

It will be understood that in this method the amount of sodium silicate solution is not enough to be considered as a material part of the glaze, and its major purpose is to settle or control dust thrown off by the granule charge.

The advantages of the last mentioned method are that the raw glaze is a low cost material and that a good relatively dry mix is obtained which handles easily in a screw feeder. The sodium silicate cements the glaze to the granules in such a way as to prevent ring formation due to dust in the furnace, and the process has the advantage of economy in operation.

By the ring formation referred to is meant the depositing of dust particles of glaze in the early stages of firing, which eventually chokes up the opening in the furnace almost completely. Reference is made to this elsewhere in this description.

A further alternative method of coating the granule involves the employment of a raw glaze containing sodium dichromate in which the process is a continuous wet process. I find that this process is generally applicable to production of the green colored granule only.

The steps of the process are as follows:

The raw glaze is made up by mixing together the materials such as set out in the raw glaze formula appearing elsewhere in this description, and sodium dichromate is used as one of the ingredients. The quartz or quartzite granules are wetted with water in a concrete mixer or the like, and the dry powdered glaze is added thereto until the mass is homogeneous. The thus coated quartzite granules are then fed continuously into a rotary furnace and heat is applied for fusing the glazing material on to the individual granules.

The advantages of this method are that the sodium dichromate melting at a low temperature (325° C.) acts as a vehicle to bond the glaze constituents to the granule and help their spreading in the early stages of the process, and, as a result, better coating is obtained.

The function of agitation as applied to the foregoing process is that a better spreading of the molten glaze over the surface of the quartzite granules is accomplished by agitation, and, in the case where raw glazes are employed, the agitation serves as a means for thoroughly homogenizing the glaze film itself. Furthermore, heat transfer is facilitated during the agitation step.

The base for the raw glaze as disclosed herein consists of a mixture of borax, whiting, and quartz fines, and, of course, it will be understood that the composition of this base may be varied considerably. To the above base may be added any of the commonly known ceramics coloring agents such as chromium oxide, for green, cobalt oxide for blue, iron oxide for red, etc. For green, as hereinabove pointed out, I prefer to replace part of the chromium oxide by sodium dichromate, inasmuch as the latter is lower in cost and has the processing advantages already pointed out. Sodium dichromate melts at about 320° C., and the molten salt acts as a bond to hold the glaze constituents to the granule during the preliminary stages of firing before the glaze proper becomes molten, and this is particularly important in a raw glaze containing borax, for the reason that borax tends to puff up or intumesce upon heating. This intumescence is very light and powdery and much of it is blown out of the furnace and lost. Sodium dichromate performs the function of preventing this intumescence and makes for a better coating product. There are other materials such as sodium nitrate, potassium nitrate, and barium hydrate having this desirable property, that is, preventing intumescence and which are applicable to colors other than green.

I desire to point out that the use of water in the preliminary mixing, while not absolutely essential, has the advantages of (1) minimizing the dust hazard during the mixing operation; (2) causing the glaze constituents to adhere slightly to the granules, thus preventing separation of the glaze from the quartz in the feeding equipment; (3) the water in the mix helps to minimize the formation of deposits in the furnace; and (4) when sodium dichromate is used in the mix, this is most easily handled as a water solution.

I find it convenient in using water not to make up a slurry of the glaze constituents and water as some of the prior processes known to me now do, but rather to add them separately to the mixer. This is done in all cases except where sodium dichromate is dissolved in the water, and I also desire to point out that in most cases I do not employ enough water to make an actual slurry of thin enough consistency to spread on the granules in a mixer.

I desire to point out that the employment of sodium dichromate, a low fusing salt, and sodium nitrate, potassium nitrate and other salts of similar properties in the firing process permits the functioning of these elements as a bonding or spreading agent in the preliminary stages of firing. The glaze itself begins to melt in the range of 600° to 700° C. The low fusing salts melt at 300 to 400° C. or even lower if water is present, and act as a vehicle for the rest of the glaze constituents, carrying them to the granules and facilitating their adherence, at the same time preventing their loss through the agitation of the furnace until these constituents become hot enough to melt and thus remain on the granule.

I thus definitely divide the firing of the product into substantially two stages, that is to say, (1) the interval from the charging of the furnace to the time at which the glaze fuses; and (2) the interval from the time of fusing of the glaze to the time of discharge of the completely coated product. It appears, therefore, that the function of the low melting salts referred to applies only in the first stage of heating. However, agitation of the mass in the furnace applies to both stages of heating, the latter heating stage being termed the maturing stage of the glaze.

It will be understood that with my processes disclosed herein, the employment of a fluxing agent reduces the ultimate temperature at which the silica content of the glaze mixture tends to melt or fuse, and for my purposes I have employed boric acid such as is contained in the borax disclosed in my formulae. Thus it is not necessary to go to such high temperatures as 1600°, to 1750° C. ordinarily required for fusing silica such as quartz and quartzite. For further modifying the fluxing temperature, I have in some instances added other fluxing agents where desired.

In my processes herein described, both where the smaller silica fines adhere to the base granule and/or where silica fines are added in accordance with the formula appearing herein where desired, the ultimate granule coating is found to be composed of the larger silica fines not entirely fused and the smaller silica fines appear to be substantially dissolved into homogeneity with glaze coating.

By proper regulation of the temperatures employed, and periods of heat treatment, as well as other variations, such as in the ingredients employed, the characteristics of the ultimate glaze coating may be controlled to produce a substantially completely glazed granule of excellent weathering properties, each granule having irregularities in its coating surface which facilitate its adherence to a bituminously coated sheet for roofing purposes.

Having thus described my invention and illustrated its use, what I claim as new and desire to secure by Letters Patent is:

1. Roofing granules, each granule of which has a surface coating composed of partly fused granule particles and completely fused granule particles.

2. Granular material, each particle of which is provided with a coating including relatively much smaller particles of the same material, a portion of said smaller particles being completely fused and a portion of said smaller particles being partly fused.

3. Granular material, each particle of which consists of a central unitary homogeneous nucleus of quartzitic material and a coating of particles of fusible material of relatively small size fused together and to the surface of the nucleus, the nucleus and coating particles being of the same material.

4. A roofing material comprising a base the surface of which is mineralized with glazed granules as set forth in claim 3.

5. A roofing material comprising a base the surface of which is mineralized with glazed granules as set forth in claim 1.

6. A roofing material comprising a base the surface of which is mineralized with glazed granules as set for thin claim 2.

7. Roofing granules, each granule of which has a surface coating composed of partly fused granule particles and completely fused granule particles of a separately prepared batch.

8. Granular material, each particle of which is provided with a coating including relatively much smaller particles of the same material, a portion of said smaller particles being completely fused and a portion of said smaller particles being partly fused of a separately prepared batch.

9. Granular material, each particle of which consists of a central unitary homogeneous nucleus of quartzitic material and a coating of particles of fusible material of relatively small size fused together and to the surface of the nucleus of a separately prepared batch, the nucleus and coating particles being of the same material.

10. A roofing material comprising a base the surface of which is mineralized with glazed granules as set forth in claim 9.

11. A roofing material comprising a base the surface of which is mineralized with glazed granules as set forth in claim 7.

12. A roofing material comprising a base the surface of which is mineralized with glazed granules as set forth in claim 8.

13. Granular material, each individual particle of which comprises a base and a surface coating of a plurality of superficially and partly fused glaze producing materials in particle form in a film comprising said glaze producing materials in a completely fused condition.

14. Granular material, each individual particle of which comprises a base and a surface coating of a plurality of superficially and partly fused glaze producing materials in particle form, said partly fused glaze materials being bonded to said base by a film of said glaze materials in a fused condition.

15. A granule of the character described, comprising a base and an uneven surface coating comprising superficially and partly fused glaze producing materials in particle form bound onto said base by a film of said glaze materials in a completely fused condition.

16. Granular material, each individual granule of which comprises a base, a surface coating on the base formed of superficially and partly fused glaze forming materials in particle form bonded and interfused to said base by a film of a portion of said glaze forming materials in a fused condition.

17. Granular material, each individual granule of which comprises a base, a surface coating on the base formed of superficially and partly fused glaze forming materials in particle form bonded to each other and to said base by a film of a portion of said glaze forming materials in a fused condition.

18. Granular material, each individual granule of which comprises a base, a surface coating of glaze producing materials, a portion of which are fused and form a matrix film for other portions of said glaze producing materials in particle form which are embedded in said matrix in a superficially and partly fused condition.

19. Granular material, each individual granule of which comprises a base, a surface coating of glaze producing materials, a portion of which are completely fused and form a matrix film for other portions of said glaze producing materials, said other materials being embedded in said matrix in a discernible form and are superficially fused, providing an uneven surface for said base granules.

20. A roofing material comprising a base, the surface of which is mineralized with glazed granules as set forth in claim 13.

21. A roofing material comprising a base, the surface of which is mineralized with glazed granules as set forth in claim 15.

22. A method of making granular material which consists of producing granules from vitreous material, applying thereto a coating including a flux and relatively much smaller particles of the same material in differing sizes, and then firing the coated granules at such a temperature and for such a time as to fuse the surfaces only of the granules, as to completely fuse the smaller of the coating particles, and as to partly fuse the larger of the coating particles.

23. A method of making granular material which consists of producing granules from vitreous material, applying thereto a liquid coating including a flux and relatively much smaller particles of the same vitreous material in differing sizes, drying the coating, and then firing the coated granules at such a temperature and for such a time as to fuse the surfaces only of the granules, as to completely fuse the smaller particles of the coating, and as to partly fuse the larger particles of the coating.

24. A method of making granular material which consists of producing granules from vitreous material, applying thereto a separately prepared coating composition including a flux and relatively much smaller particles of the same material in differing sizes, and then firing the coated granules at such a temperature and for such a time as to fuse the surfaces only of the granules, as to completely fuse the smaller of the coating particles, and as to partly fuse the larger of the coating particles.

25. A method of making granular material which consists of producing granules from vitreous material, applying thereto a separately prepared liquid coating composition including a flux and relatively much smaller particles of the same vitreous material in differing sizes, drying the coating, and then firing the coated granules at such a temperature and for such a time as to fuse the surfaces only of the granules, as to completely fuse the smaller particles of the coating, and as to partly fuse the larger particles of the coating.

26. A method of making granular material consisting of forming granules of a desired size from mineral material, applying thereto a coating consisting of glaze producing materials of different melting points in particle form and firing the same at a temperature and for a time to fuse completely some of said particles of glaze producing materials and to fuse superficially others of said particles of glaze producing materials.

GEORGE W. SWENSON.

CERTIFICATE OF CORRECTION.

Patent No. 2,331,357. October 12, 1943.

GEORGE W. SWENSON.

It is hereby certified that error appears in the printed specification of the above numbered patent requiring correction as follows: Page 1, first column, line 16, for "1931" read --1932--; page 5, first column, line 39, claim 6, for "for thin" read --forth in--; and second column, line 36, claim 19, after "materials" insert --in particle form--; and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.